(No Model.) 3 Sheets—Sheet 1.
E. & J. LHOEST.
VELOCIPEDE.
No. 352,698. Patented Nov. 16, 1886.
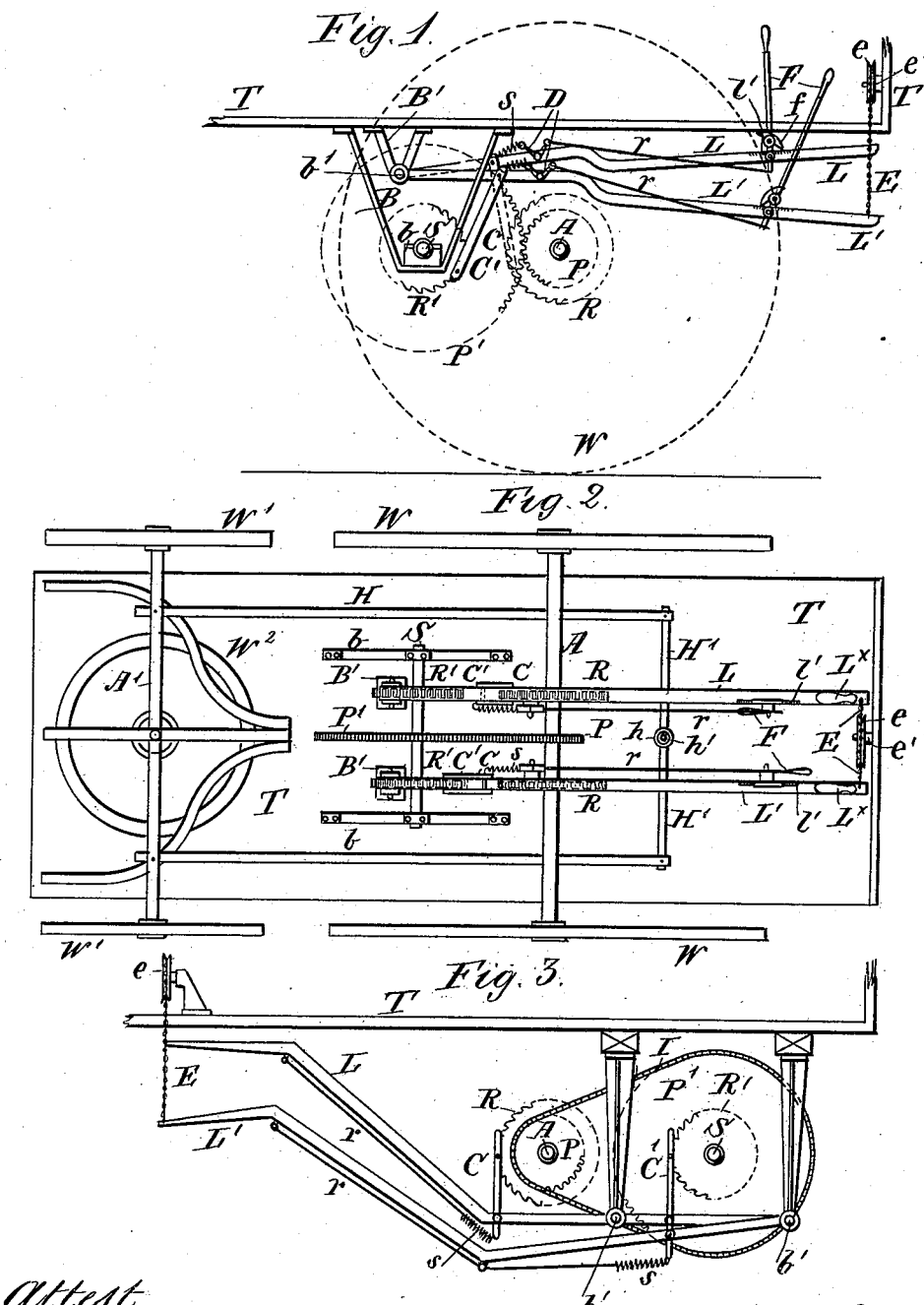
Attest
M. Knobloch
C. J. Northup
Inventors
Emile Lhoest
Jules Lhoest
by Henry Orth
their atty (No Model.) 3 Sheets—Sheet 2.
E. & J. LHOEST.
VELOCIPEDE.
No. 352,698. Patented Nov. 16, 1886.
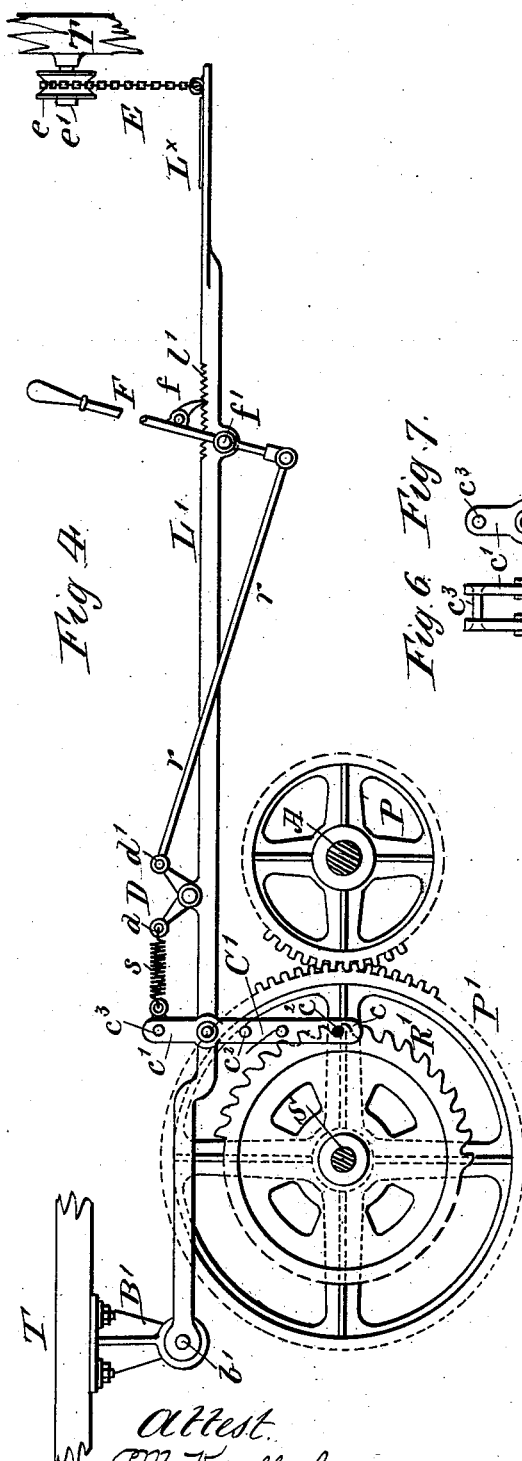
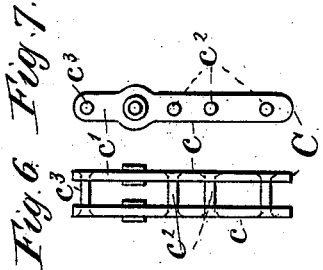
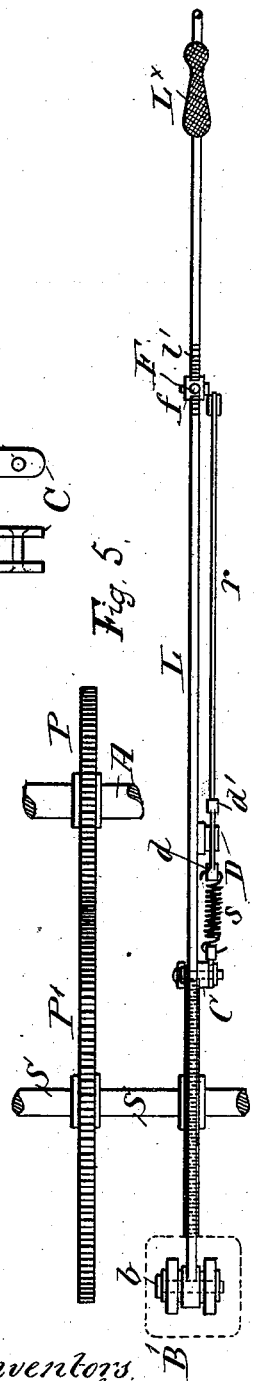
Attest:
C. M. Knobloch
C. G. Northup
Inventors
Emile Lhoest
Jules Lhoest (No Model.) 3 Sheets—Sheet 3.

E. & J. LHOEST.
VELOCIPEDE.

No. 352,698. Patented Nov. 16, 1886.

Attest.
P. M. Knobloch
C. G. Northup

Inventors
Emile Lhoest
Jules Lhoest
Henry Orth
Their att'y

UNITED STATES PATENT OFFICE.

EMILE LHOEST AND JULES LHOEST, OF PARIS, FRANCE.

VELOCIPEDE.

SPECIFICATION forming part of Letters Patent No. 352,698, dated November 16, 1886.

Application filed July 14, 1886. Serial No. 207,985. (No model.) Patented in France November 25, 1885, No. 172,523.

*To all whom it may concern:*

Be it known that we, EMILE LHOEST and JULES LHOEST, citizens of the French Republic, residing at Paris, in said French Republic, have invented certain new and useful Improvements in Velocipedes, (for which we have received French Letters Patent No. 172,523, dated November 25, 1885;) and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 8:
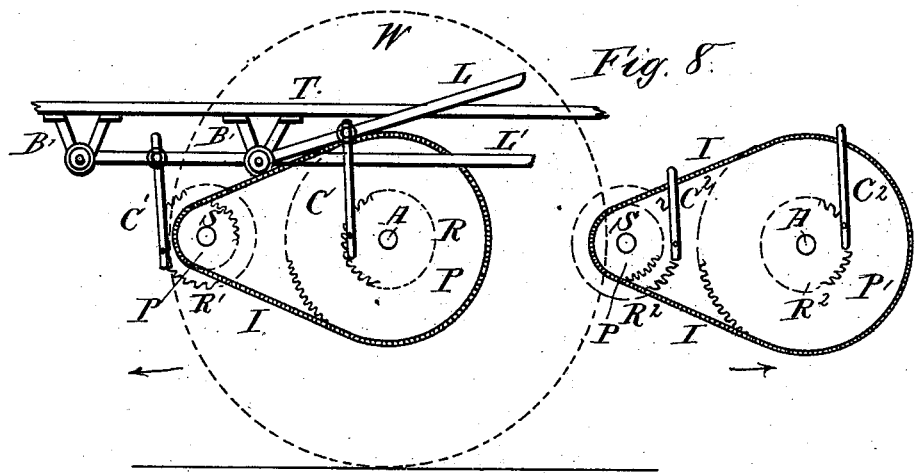
Figure 9:
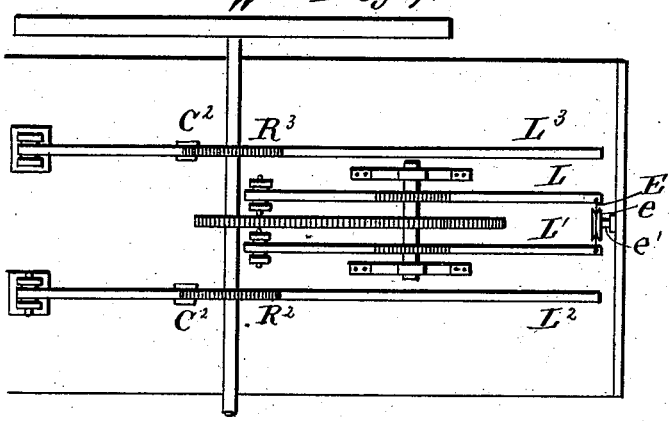
Figure 10:
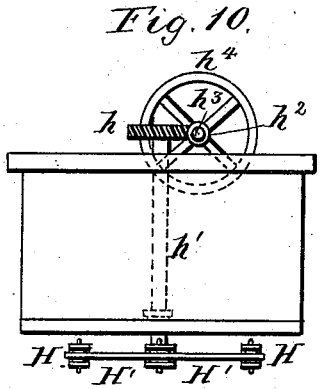

Referring to the drawings, Figure 1 is a side elevation of a portion of a vehicle embodying the principles of our invention. Fig. 2 is an under side plan view of the vehicle. Fig. 3 is a side elevation of a portion of a vehicle, showing a modification in the arrangement of the driving mechanism. Fig. 4 is an enlarged side elevation of the driving mechanism of the vehicle shown in Fig. 1. Fig. 5 is a top plan view of Fig. 4. Fig. 6 is a face view, and Fig. 7 a side view, of one of the driving-pawls drawn to an enlarged scale. Fig. 8 is a side elevation of the driving mechanism of the vehicle, showing a further modification of the arrangement of the same. Fig. 9 is an under side plan view of a vehicle, showing a driving mechanism for propelling the vehicle backward as well as forward, and Fig. 10 is an end elevation of the driver's seat, showing the steering mechanism.

This invention relates to mechanism for propelling three or four wheeled vehicles, and has for its object to so arrange the various parts of the propelling mechanism as to reduce as much as possible the power required for driving or propelling the same.

To this end the invention consists in the combination and arrangement of the several parts that constitute our improved propelling mechanism, substantially as hereinafter fully described, and as set forth in the claims.

In Figs. 1 and 2 we have shown our improved mechanism applied to a four-wheeled vehicle and arranged to propel said vehicle in one direction only. In these figures, W indicates the main driving-wheels; W', the fore wheels; T, the trucks or frames; and $W^2$, the fifth-wheel, secured to the fore axle, A', and pivoted in the vehicle-frame in any usual or preferred manner to adapt said fore wheel, W', to rotate around a pivot for the purpose of guiding or steering the vehicle.

Upon the axle A of the main drive-wheels W is secured a pinion, P, and on opposite sides thereof a ratchet-wheel, R, and on pendent brackets B are formed or secured the bearings $b$ for a counter-shaft, S, upon which shaft is mounted a gear-wheel, P', and on opposite sides thereof a ratchet-wheel, R', said gear-wheel meshing with the pinion P on axle A.

To the under side of the vehicle-frame are bolted two brackets, B' B', in which are formed bearings for the fulcrum pin or bolt $b'$ of the foot-levers L and L', to each of which is pivoted a pawl. C and C', respectively, the said pawls engaging the teeth of the ratchet-wheels R and R', respectively. The pawls, as more plainly shown in Figs. 4, 6, and 7, are composed of two cheek-pieces, $c$, that project some distance above the point where the pawl is pivoted to its lever to form ears $c'$, said cheek-pieces being connected by iron bolts $c^2 c^3$, of which we have shown four, the three bolts $c^2$ acting upon the teeth of the ratchet, and the bolt $c^3$ serving as an attachment for the adjusting devices, whereby the amplitude of the throw of the pawls is adjusted. These devices, as more plainly illustrated in Fig. 4, consist of a bell-crank lever, D, one for each foot-lever L and L', to which the bell-crank levers are pivoted, of a spring, $s$, one end of which is secured to the arm $d$ of the bell-crank lever and the other end is secured to the cross-bolt $c^3$ of the pawl above the fulcrum $l$ thereof, of a connecting-rod, $r$, connected with the arm $d'$ of lever D, and an operating-lever, F, pivoted upon the foot-lever, connected with the bell-crank lever by means of said connecting-rod. The lever F carries a pawl, $f$, that engages with the teeth of a toothed portion, $l'$, of the foot-lever to hold the pawl in the position to which it may be adjusted. The yielding or spring connection between the pawl and bell-crank lever D insures the engagement of the cross-bolts of said pawl with the ratchet-teeth, and by rotating the lever F to the right or left on its fulcrum $f'$ the amplitude of the throw of the pawl can be regulated, as will be readily understood. The outer ends of the levers L and L' are supported from a chain, E, that runs over a pulley, e, loosely mounted on a stud, e', secured to the vehicle-frame.

It is obvious that when the driver from his seat alternately depresses the levers L and L' the pawls C and C' will alternately engage the teeth of the ratchet R and R', and thereby impart a partial rotation to the said ratchet, which is converted into a continuous rotation, or practically so, through the gearing P and P'.

Inasmuch as the point where the power is applied to the levers L and L' is at a comparatively great distance from the point where said power is exerted on the ratchet-wheels, a great leverage is obtained, requiring but slight exertion to drive the vehicle at a very rapid rate. The levers are provided with pedals $L^x$ for the operator's feet.

The steering of the vehicle is effected by the following instrumentalities: To the fore wheel-axle, A', on each side of the fifth-wheel $W^2$, is pivotally secured one end of a connecting-rod, H, whose other end is pivoted to a cross-bar or lever, H', that is rigidly secured upon a spindle or shaft, h', rotatably mounted on the vehicle-frame. At its upper end the spindle carries a worm-wheel, h, Fig. 10, that gears with a worm, $h^2$, on a spindle, $h^3$, that also carries the hand-wheel $h^4$.

It will be seen that on rotating the hand-wheel in one or the other directions the fore-wheel axle A', and the fore wheels will be correspondingly rotated on their vertical pivot to change the direction of the vehicle from a straight course to one toward the right or left, as the case may be.

With the mechanism described the course of the vehicle cannot be reversed, and when this is desirable we employ a separate driving mechanism, as shown in Fig. 9, in which the levers $L^2 L^3$, the ratchets $R^2 R^3$, and suitable pawls, $C^2 C^3$, engaging said ratchets in a reversed manner from that described in reference to the ratchets R R', constitute the reversing mechanism, so that the vehicle may be driven forward or backward, as desired.

Instead of directly gearing the wheels P and P', as described in reference to Figs. 1 and 2, the said wheels may be indirectly geared together by means of a chain, I, such as a Vaucanson chain, as shown in Figs. 3 and 8, the latter figure showing both mechanism for driving the vehicle forward and backward, the mechanism on the left of Fig. 8 serving to drive the vehicle forward, and that on the right to reverse its course.

It is not absolutely necessary that the large gear-wheel should be mounted on the counter-shaft S, as it may be mounted on the axle A of the main driving-wheels, as shown in said Figs. 3 and 8, and instead of ranging the foot-levers L and L' above the ratchets, they may be suspended below said ratchets, as shown in Fig. 3, without departing from the nature of our invention.

Having described our invention, what we claim is—

1. In a velocipede, the combination, with the driving-axle of a ratchet-and-pawl driving mechanism such as described, and a foot-lever to which said pawl is connected and from which it is operated, of mechanism for varying the throw of the pawl, consisting of a bell-crank and hand-lever pivoted to the foot-lever and connected together by a connecting-rod, a yielding connection between the bell-crank lever and pawl above the fulcrum of the latter, and a locking-pawl pivoted to the hand-lever and arranged to engage notches formed in the foot-lever to lock said hand-lever into position, substantially as described, for the purposes specified.

2. In a velocipede, the combination, with the pivoted fore axle, A', the main axle A, the counter-shaft S, said main axle and counter-shaft being geared together and carrying each a ratchet, foot-levers and pawls pivoted thereto for operating the ratchets, of adjusting devices, such as described, for adjusting the throw of the pawls, and a steering mechanism consisting of steering-spindle h', carrying worm-wheel h, the operating-worm $h^2$, the cross-head or lever H', and the connecting-rod H, connecting said cross-head with the fore axle, substantially as described, for the purpose specified.

3. In a velocipede, the combination, with the pivoted fore axle, A', the main axle A, and counter-shaft S, geared together and carrying each a pair of ratchet-wheels, of the foot-levers L L', pivoted at one end and supported from a chain and pulley at the other, the pawls C C', pivoted to said foot-levers and constructed of two side pieces and two or more cross-bars arranged for operation on the teeth of the ratchets for driving the vehicle in one direction, a corresponding ratchet-and-pawl mechanism for driving the vehicle in a reverse direction, adjusting devices mounted on the foot-levers for adjusting the throw of the pawls, a yielding connection between said adjusting devices and the driving-pawls, and a steering mechanism consisting of a worm-gearing connected with and controlling the movements of said fore axle on its pivot, substantially as described, for the purposes specified.

In testimony that we claim the foregoing we have hereunto set our hands this 7th day of June, 1886.

EMILE LHOEST.
          JULES LHOEST.

Witnesses:
  ROBT. M. HOOPER,
  LEON SCHMITTBUHL.